(12) United States Patent
Sandhage et al.

(10) Patent No.: US 6,616,826 B1
(45) Date of Patent: Sep. 9, 2003

(54) ELECTROLYSIS APPARATUS AND METHODS USING URANIA IN ELECTRODES, AND METHODS OF PRODUCING REDUCED SUBSTANCES FROM OXIDIZED SUBSTANCES

(75) Inventors: Kenneth H. Sandhage, Upper Arlington, OH (US); Robert L. Snyder, Dublin, OH (US)

(73) Assignee: The Ohio State University, Columbus, OH (US)

( * ) Notice: Subject to any disclaimer, the term of this patent is extended or adjusted under 35 U.S.C. 154(b) by 0 days.

(21) Appl. No.: 09/630,180

(22) Filed: Aug. 1, 2000

Related U.S. Application Data

(62) Division of application No. 09/224,158, filed on Dec. 31, 1998, now Pat. No. 6,146,513.

(51) Int. Cl.$^7$ .............. C25C 1/22; C25C 3/34; C25C 7/00; C25B 9/00; C25B 11/04
(52) U.S. Cl. .............. 205/46; 204/242; 204/267; 204/291; 204/292; 204/293
(58) Field of Search .............. 205/46–47; 429/2, 429/30, 31, 32; 204/290.02, 291–293, 242

(56) References Cited

U.S. PATENT DOCUMENTS

| | | | | |
|---|---|---|---|---|
| 2,490,826 A | | 2/1949 | Mochel | 106/55 |
| 2,490,825 A | | 12/1949 | Mochel | 106/55 |
| 2,781,304 A | | 2/1957 | Wilhelm et al. | 205/47 |
| 2,930,738 A | | 3/1960 | Roake et al. | 205/47 |
| 2,936,268 A | * | 5/1960 | Stern et al. | 205/47 |
| 3,287,284 A | | 11/1966 | Norman | 252/518 |
| 3,502,597 A | | 3/1970 | Bush | 252/518 |
| 3,960,678 A | | 6/1976 | Alder | 204/67 |
| 4,039,401 A | | 8/1977 | Yamada et al. | 204/67 |
| 4,057,480 A | | 11/1977 | Alder | 204/290 |
| 4,098,669 A | | 7/1978 | De Nora et al. | 204/252 |
| 4,151,051 A | * | 4/1979 | Evans | 205/339 |
| 4,374,761 A | | 2/1983 | Ray | 252/519 |
| 4,454,015 A | | 6/1984 | Ray et al. | 204/293 |
| 4,455,211 A | | 6/1984 | Ray et al. | 204/293 |
| 4,702,971 A | * | 10/1987 | Isenberg | 429/31 |
| 4,995,948 A | | 2/1991 | Poa et al. | 205/47 |

FOREIGN PATENT DOCUMENTS

| | | |
|---|---|---|
| GB | 1152124 | 5/1967 |
| SE | 520 779 | 3/1972 |

OTHER PUBLICATIONS

Dai, et al., Solubilities of Uranium (IV) Dioxide in Magnesium Chloride, Calcium Chloride, and Aluminum Chloride Melts: A Comparative Study, J. Phys. Chem., vol. 100, No. 1, 1996, pp. 220–223.

Haas, et al., Solubility of Uranium Oxides in Fluoride Salts at 1200°C, Journal of Chemical and Engineering Data, vol. 38, No. 1, 1993, pp. 26–30.

Olsen, et al., The Behavior of Nickel Ferrite Cermet Materials as Inert Anodes, Department of Electrochemistry Norwegian Institute of Technology N–7034 Trondhein, Norway, pp. 249–257.

Pawlek, Rudolf P., Inert Anodes for the Primary Aluminum Industry: An Update, Light Metals 1996, pp. 243–248.

Ray, S.P., Effect of Cell Operating Parameters on Performance of Inert Anodes in Hall–Heroult Cells, Light Metals 1997, pp. 367–380.

Piper, R.D., Production of Uranium Metal From Uranium Oxide By Fused Salt Electrolysis, vol. 5, No. 3–4, pp. 147–151.

Zhang, et al., Materials Used in the Hall–Heroult Cell for Aluminum Production, The Minerals, Metals & Materials Society.

* cited by examiner

*Primary Examiner*—Donald R. Valentine
(74) *Attorney, Agent, or Firm*—Standley & Gilcrest LLP

(57) ABSTRACT

The present invention includes uranium-bearing ceramic phase electrodes and electrolysis apparatus and electrolysis methods featuring same, including methods of metal production and the like by the electrolytic reduction of oxides or salts of the respective metals. More particularly, the invention relates to an inert type electrode composition, and methods for fabricating electrode compositions, useful in the electrolytic production of such metals. The present invention also includes an inert-type electrode composition, and methods for fabricating electrode compositions, used in processes for generating energy from fossil fuels.

20 Claims, No Drawings

ELECTROLYSIS APPARATUS AND METHODS USING URANIA IN ELECTRODES, AND METHODS OF PRODUCING REDUCED SUBSTANCES FROM OXIDIZED SUBSTANCES

This application is a divisional of U.S. application Ser. No. 09/224,158 filed Dec. 31, 1998, now U.S. Pat. No. 6,146,513, which is incorporated herein by reference.

TECHNICAL FIELD

The present invention is in the field of electrodes and electrolysis apparatus, and includes inventions pertaining to the production of metals such as aluminum, lead, magnesium, zinc, zirconium, titanium, silicon, and the like by the electrolytic reduction of oxides or salts of the respective metals. More particularly, the invention relates to an inert type electrode composition, and methods for fabricating the electrode composition, useful in the electrolytic production of such metals.

This invention also relates to an inert-type electrode composition, and methods for fabricating the electrode composition, used in processes for generating energy from fossil fuels.

BACKGROUND

A number of industrial manufacturing processes require the use of a high-temperature, corrosion-resistant electrodes. Examples include the Hall-Heroult process for producing aluminum from alumina-bearing ores, and electric arc furnaces for the manufacture of steel and for the melting of refractory metals and ceramics. Industrial processes for energy generation from fossil fuels also require the use of electrode materials that are high-melting and resistant to degradation. Examples of the latter include energy production by the magnetohydrodynamic (MHD) process and solid oxide fuel cells.

It is known to produce aluminum by molten salt electrolysis of aluminum oxide dissolved in a bath of aluminum sodium fluoride ($AlF_3 \cdot 3NaF$) or so-called cryolite, by using a carbon anode. This electrolysis is usually conducted at about 900°–1000° C.

When aluminum is produced by using a carbon anode, the carbon anode is oxidized and consumed by about 330 kg theoretically and about 400–450 kg actually per ton of aluminum due to oxygen produced through the decomposition of aluminum oxide. For this reason, it is necessary to continuously adjust the position of the electrode to maintain it at a constant level, and it is also required to replace the anode by a new one before it is completely consumed. These are economical and operational defects.

In the electrolytic production of aluminum by the Hall-Heroult process a cryolite melt with $Al_2O_3$ dissolved in it is electrolyzed at 940°–1000° C. The aluminum which separates out in the process collects on the cathodic carbon floor of the electrolysis cell whilst $CO_2$ and to a small extent CO are formed at the carbon anode. The anode is thereby burnt away.

For the reaction

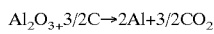

this combustion should in theory consume 0.334 kg C/kg Al; in practice however, up to 0.5 kg C/kg Al is consumed.

The burning away of the anodes has a number of disadvantages. In order to obtain aluminum of acceptable purity, a relatively pure coke with low ash content has to be used to produce the anode carbon. The pre-baked carbon anodes have to be advanced from time to time in order to maintain the optimum inter-polar distance between the anode surface and the surface of the aluminum. Periodically the pre-baked anodes when consumed have to be replaced by new ones. Soderberg anodes have to be repeatedly charged with new material. In the case of pre-baked anodes a separate manufacturing plant typically is necessary.

Accordingly, the manufacture of carbon anodes and their use in aluminum production is laborious and expensive.

The direct decomposition of $A_2O_3$ to its elements:

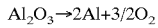

using an anode where no reaction with the oxygen takes place is therefore of greater interest. With non-reactive anodes, oxygen, which can be re-used industrially, is released, and the above mentioned disadvantages of the carbon anodes also disappear. This, anode is particularly favorable for a sealed furnace the waste gases of which can be easily collected and purified. Accordingly, in order to reduce greenhouse gas emissions and to allow for lower energy costs, manufacturers of aluminum have long sought inert anode materials to replace carbon in the Hall-Heroult Cell for aluminum production.

There are many concomitant requirements and considerations that must be satisfied in or to produce such replacement material:

1. It must be thermally stable up to 1000° C.
2. The specific electrical resistivity must be very small so that the voltage drop in the anode is a minimum. At 1000° C. the specific resistivity should be comparable with, or smaller than that of anode carbon. The specific resistivity should also be as independent of temperature as possible so that the voltage drop in the anode remains as constant as possible even when temperature changes occur in the bath.
3. Oxidizing gases are formed on the anode therefore the anodes must be resistant to oxidation.
4. The anode material should be insoluble in a fluoride or oxide melt.
5. The anode should have adequate resistance to damage from temperature change so that on introduction into the molten charge or when temperature changes occur during electrolysis it is not damaged.
6. Anode corrosion should be negligibly small. If nevertheless some kind of anode product should enter the bath then neither the electrolyte, the separated metal nor the power output should be affected.
7. On putting the anodes into service in the industrial production of aluminum, they must be stable when in contact with the liquid electrolyte, have no influence on the purity of the aluminum obtained, and operate economically. Obviously the number of materials which even approach fulfilling these extremely severe criteria is very limited.
8. The anode should have adequate mechanical strength.

In applications directed toward the electrowinning of metals such as aluminum or similar electrolysis reactions conducted at high temperature an inert anode must thus first be resistant to dissolution by cryolite-based melts. It must also be electrically conductive and mechanically robust. The replacement material must likewise be resistant to reduction by molten species, such as molten aluminum.

As an approach to obviate the above-mentioned defects in the carbon electrode, various non-consumable anodes have been developed. For example, a method using an oxygen ion-conductive anode consisting mainly of zirconium oxide has been proposed (British Patent Specification No. 1,152, 124). This method, however, is disadvantageous in that it requires an apparatus for removing oxygen produced and the operation is complex. A method using an anode consisting of electronic conductive metal oxide containing at least 80% by weight of tin oxide has also been proposed (British Pat. Specification No. 1,295,117). This method is also disadvantageous in that the anode has poor chemical resistance to the molten salt.

In the Swiss Pat. No. 520 779 an anode made of ceramic oxide material in particular 80–99% $SnO_2$ is described. However this anode was shown to be problematic in that it showed a certain amount of loss and as a result of this the aluminum obtained amongst other things was made impure by the inclusion of tin which in most cases is undesirable.

As an improvement, U.S. Pat. No. 3,960,678 to Alder disclosed a process for operating a cell for the electrolysis of aluminum oxide with one or more anodes, the working surface of which is of ceramic oxide material. However, according to the patent, the process requires a current density above a minimum value to be maintained over the whole anode surface which comes in contact with the molten electrolyte to minimize the corrosion of the anode. This patent discloses $SnO_2$, $Fe_2O_3$, $Fe_3O_4$, $Cr_2O_3$, $Co_3O_4$, NiO or ZnO as base materials. Without additives, $SnO_2$ cannot be made into a densely sintered product and it exhibits a relatively high specific resistivity at 1000° C. Additions of other oxides in a concentration of 0.01–20%, preferably 0.05–2% have to be made in order to improve such properties of pure tin oxide. To improve the sinterability, the compactness and the conductivity of the $SnO_2$, Alder teaches additions of one or more of the oxides of the following metals are found to be useful: Fe, Cu, Mn, Nb, Zn, Co, Cr, W, Sb, Cd, Zr, Ta, In, Ni, Ca, Ba, Bi.

Numerous efforts have been made to provide an inert electrode having the above characteristics but apparently without the required degree of success to make it economically feasible. That is, the inert electrodes in the art appear to be reactive to an extent which results in contamination of the metal being produced as well as consumption of the electrode. For example, U.S. Pat. No. 4,039,401 reports that extensive investigations were made to find non-consumable electrodes for molten salt electrolysis of aluminum oxide, and that spinel structure oxides or perovskite structure oxides have excellent electronic conductivity at a temperature of 9000° to 1000° C., exhibit catalytic action for generation of oxygen and exhibit chemical resistance. However, commercial use of these anodes has not been realized because they are not sufficiently inert.

Thus, it can be seen that there remains a great need for an electrode which is substantially inert or is resistant to attack by molten salts or molten metal to avoid contamination and its attendant problems.

It has been proposed that an inert electrode be constructed using ceramic oxide compositions having a metal powder dispersed therein for the purpose of increasing the conductivity of the electrode. For example, when an electrode composition is formulated from NiO and $Fe_2O_3$, a highly suitable metal for dispersing through the composition is nickel which may increase the conductivity of the electrode by as much as 30 times.

However, it has been found that the search for inert electrode materials possessing the requisite chemical inertness and electrical conductivity is further complicated by the need to preserve certain mechanical characteristics which may be either enhanced or impaired by modifications to enhance the chemical resistance or electrical conductivity. For example, the electrode should possess certain minimum mechanical strength characteristics tested by the modulus of rupture, fracture toughness and expansion and resistance to thermal shock of the electrode material as well as the ability to weld electrical connections thereto must also be taken into account. An article entitled "Displacement Reactions in the Solid State" by R. A. Rapp et al, published May 1973, in Volume 4 of Metallurgical Transactions, at pages 1283–1292, points out the different morphologies which can result from the addition of a metal or metal alloy to an oxide mixture. The authors show that some additions result in layers of metal or metal oxides while others form aggregate arrangements which may be lamellar or completely interwoven. The authors suggest that interwoven-type microstructures should be ideal for the transfer of stresses and resistance to crack propagation and demonstrated that such were not fractured by rapid cooling. The authors suggested that such an interwoven structure would be useful in the preparation of porous electrodes for fuel cells or as catalysts for reactions between gases by selective dissolution of either the metal or oxide phase.

U.S. Pat. No. 4,039,401 discloses a non-consumable electrode for electrolytic production of aluminum containing at least 50% by weight of spinel structure oxide having the general formula $XYY'O_4$ (wherein X is a divalent or tetravalent metal, Y and Y' may be either the same or different and are trivalent or divalent metals, O is oxygen atom, provided that when X is a divalent metal, Y and Y' are selected from trivalent metals but the spinel structure oxides are excluded in which both Y and Y' are trivalent iron, Fe(III), and when X is a tetravalent metal, Y and Y' are selected from divalent metals), or a perovskite structure oxide having the general formula $RMO_3$ (wherein R is a monovalent, divalent or trivalent metal, M is a pentavalent, tetravalent or trivalent metal, O is oxygen atom, provided that when R is a monovalent metal, M is selected from pentavalent metals, and when R is a divalent metal, M is selected from tetravalent metals, and when R is a trivalent metal, M is selected from trivalent metals), or a mixture thereof, said oxides exhibiting chemical durability against the molten salt and having electronic conductivity.

U.S. Pat. No. 4,057,480 discloses a process for operating a cell for the electrolysis of a molten charge, in particular aluminum oxide, with one or more anodes the working surfaces of which are of ceramic oxide material, and anode for carrying out the process. This patent also discloses that base materials for the anode may be $SnO_2$, $Fe_2O_3$, $Fe_3O_4$, $Cr_2O_3$, $Co_3O_4$, NiO or ZnO, and that additions of one or more of the oxides of the following metals are found to be useful to improve the sinterability, the compactness and the conductivity of the $SnO_2$: Fe, Cu, Mn, Nb, Zn, Co, Cr, W, Sb, Cd, Zr, Ta, In, Ni, Ca, Ba, Bi.

U.S. Pat. No. 4,098,669 discloses sintered electrodes comprised of a self-sustaining matrix of sintered powders of yttrium oxide and at least one electroconductive agent, the electrode being provided over at least a portion of its surface with at least electrocatalyst useful for electrolysis reaction and bipolar electrodes with the matrix and electrolysis cells containing the electrodes.

U.S. Pat. No. 4,374,761 discloses an inert electrode composition suitable for use in the electrolytic production of metal from a metal compound dissolved in a molten salt. The electrode comprises a ceramic oxide composition and at least one metal powder dispersed through the ceramic oxide composition for purposes of increasing its conductivity, the metal powder selected from the group consisting of Ni, Cu, Co, Pt, Rh, In and Ir.

U.S. Pat. No. 4,454,015 discloses an inert electrode composition suitable for use as an inert electrode in the production of metals such as aluminum by the electrolytic reduction of metal oxide or metal salt dissolved in a molten salt bath. The composition comprises one or more metals or metal alloys and metal compounds which may include oxides of the metals comprising the alloy.

U.S. Pat. No. 4,455,211 discloses inert electrode compositions suitable for use in the production of metal by the electrolytic reduction of a metal compound dissolved in a molten salt. This patent discloses electrode compositions formed by reacting together two or more metal-containing reactants to provide an in situ displacement reaction.

The aforementioned patents are hereby incorporated herein by reference.

It is an object of the present invention to provide a non-consumable electrode which does not react with oxygen to form greenhouse gases, and which has chemical resistance to the molten salt.

The electrodes used in the MHD process for energy generation are exposed to high-temperature molten oxides generated from fossil-fuel-based reactants (i.e., from the ash obtained from coal). Electrodes used in electric arc furnaces for melting refractory oxides are also exposed to high-temperature oxide liquids. These oxides are quite corrosive at elevated temperatures and such corrosion can limit operational life. Potential electrode materials must be: i) resistant to corrosion by molten oxides, ii) electrically conductive, and iii) mechanically robust.

Another advantage of the present invention is that it may be used to provide electrodes used in the MHD process for energy generation.

Still another environmental problem is the large amount of depleted uranium that is currently stored in secure dump sites across the United States. For instance, over 700,000 metric tons of depleted uranium are stored in Ohio, Kentucky and Tennessee alone. Although depleted uranium has found some uses in applications such as in the armament industry, arising principally from its high-density, there remains a long felt need to provide additional safe, effective and economical uses for this material.

Accordingly, another object of the present invention is to provide uses for depleted uranium in order to provide a use for this nuclear waste material which is otherwise hazardous and costly to store.

Although described with respect to the Hall-Heroult process for producing aluminum from alumina-bearing ores, electric arc furnaces for the manufacture of steel and for the melting of refractory metals and ceramics, and the MHD process, it will be appreciated that similar advantages, may obtain in other applications of the present invention. Such advantages may become apparent to one of ordinary skill in the art in light of the present disclosure or through practice of the invention.

SUMMARY OF THE INVENTION

The present invention is in the field of electrodes and electrolysis apparatus, and includes inventions pertaining to the production of metals including those such as aluminum, lead, magnesium, zinc, zirconium, titanium, silicon, and the like by the electrolytic reduction of oxides or salts of the respective metals. More particularly, the invention relates to an inert type electrode composition, and methods for fabricating electrode compositions, useful in the electrolytic production of such metals. These metals are typically obtained by electrolysis from molten salt baths, containing dissolved compounds of said metals and the electrode of the present invention is particularly well suited to these processes.

This invention also relates to an inert-type electrode composition, and methods for fabricating electrode compositions, used in processes for generating energy from fossil fuels.

In general terms, the electrode composition of the present invention is one suitable for-use in the electrolytic production of a metal from a metal compound dissolved in a molten salt, and may also be suitable for use in processes for generating energy from fossil fuels.

The inert electrode of the present invention comprises a composition comprising in principal part a uranium-bearing ceramic phase. It may additionally comprise at least one additional phase of a metal, metal alloy, metal compound, ceramic, ceramic alloy or ceramic compound, or mixtures thereof, other than the uranium-bearing ceramic phase. The one or more additional phases may include at least one discontinuous phase other than the uranium-bearing ceramic phase.

For purposes of the present invention, it shall be understood that being in principal part a uranium-bearing ceramic phase shall include those compositions that form electrodes that contain a uranium-bearing ceramic phase sufficient to render the surface presented to the molten salt electrolyte inert to chemical and thermal attack. Typically, where solid monolithic electrodes are used, this will involve use of a uranium-bearing ceramic phase containing at least 5% by weight uranium-bearing ceramic(s), including those which may include urania ($UO_{2\pm x}$), uranium carbide or nitride, and composites and compounds thereof, or combinations or composites thereof. The uranium used may be from any source, including mined ore or depleted uranium stockpiles. The electrodes of the present invention may contain one or more additional phases of one or more metals, ceramics, polymers, or metal oxides other than urania, carbides or nitrides other than uranium carbide or nitride, or mixtures thereof. The electrodes of the present invention preferably may be up to 20 percent, more preferably up to 50 percent, or most preferably up to and above 80 percent of a uranium-bearing ceramic phase, depending upon the desired application. The electrodes of the present invention may also use uranium-bearing ceramic phases in separate pieces or in the form of coatings which are in principal part a uranium-bearing ceramic phase, mounted on a suitable substrate, such that the surface presented to the molten salt electrolyte inert to chemical and thermal attack.

The one or more additional phases may be continuous or discontinuous, and in a most preferred embodiment include a discontinuous metal phase, such as a discontinuous copper metal phase. The additional phase(s) may include iron, nickel copper, platinum, cobalt, rhodium, iridium and alloys thereof, or conductive ceramics such as nitrides, carbides oxides or intermetallic compounds, or refractory hard metals including carbon and graphite.

The electrodes of the present invention may be mounted on a structural support for supplementary mechanical strength. For instance, the electrode material may be mounted on a support (such as in the form of a cladding) in order to provide mechanical strength, such as a metal support, while providing lower costs as compared to solid uranium-bearing ceramic phase electrodes, or coated using a coating of a urania-bearing phase on an otherwise suitable substrate.

In certain instances, it may be desirable to use a uranium-bearing ceramic composition of the present invention as a cladding. In electrolytic cells, such as Hall cells, claddings containing a uranium-bearing ceramic composition may be provided on highly conductive members which may then be used as an anode. A variety of methods may be used to apply uranium-bearing ceramic composition as a cladding onto a conductive member, including, but not limited to, flame spraying, plasma spraying, sputtering, evaporation, laser ablation, chemical vapor deposition, spray deposition, molecular beam epitaxy, ion implantation, or other physical or chemical vapor deposition processes. A cladding of the uranium-bearing ceramic composition may also be applied onto a conductive member by coextrusion, dipping into a uranium-bearing melt followed by oxidation of the uranium, dipping into a slurry containing powder of the uranium-bearing ceramic composition followed by firing to sinter the powder to the conductive member, or other methods for applying thick coatings onto a substrate. This cladding approach can have the advantage of lowering or reducing the length of the resistance path between the highly conductive member and molten salt electrolyte and thereby significantly lowering the overall resistance of the cell. Highly conductive members which may be used in this application can include metals such as stainless steels, nickel, iron-nickel alloys, copper, and the like whose resistance to attack by molten salt electrolyte might be considered inadequate yet whose conductive properties can be considered highly desirable. Other highly conductive members to which the composition of the invention can be applied include, in general, sintered compositions of refractory hard metals, including carbon and graphite, or conductive ceramics or conductive composites of ceramic and metal.

The thickness of the cladding applied to the conductive member should be sufficient to protect the member from attack and yet maintained thin enough to avoid unduly high resistances when electrical current is passed there through. Conductivity of the coating should be at least 0.01 $ohm^{-1}cm^{-1}$.

The invention includes an electrolysis bath featuring a uranium-bearing ceramic phase electrode, apparatus for producing a reduced substance from an oxidized substance featuring a uranium-bearing ceramic phase electrode, and a method of producing a reduced substance from an oxidized substance, featuring use of a uranium-bearing ceramic phase electrode. The present invention specifically includes an apparatus for producing aluminum metal from alumina or alumina-bearing ores, featuring a uranium-bearing ceramic phase electrode, and a method of producing aluminum metal from alumina or alumina-bearing ores, featuring use of a uranium-bearing ceramic phase electrode.

The present invention also generally includes fuels cells and energy generation systems using electrodes of the present invention. Examples include solid oxide fuel cells and MHD fuel generation systems.

In broadest terms, the present invention includes an electrolysis apparatus featuring a uranium-bearing ceramic phase electrode, the electrolysis apparatus comprising: (a) an electrolyte; (b) at least one anode in contact with the electrolyte, the at least one anode comprising in principal part a uranium-bearing ceramic phase; and (c) an electrical conduit connecting the electrolyte and the at least one anode so as to complete an electrical circuit comprising the electrolyte bath and the at least one anode.

The present invention also includes apparatus for producing a reduced substance from an oxidized substance, featuring a uranium-bearing ceramic phase electrode in accordance with the present invention as described herein. In general terms, the apparatus for producing a reduced substance from an oxidized substance comprises: (a) a electrolyte bath containing the oxidized substance; (b) at least one anode in contact with the electrolyte bath, the anode(s) comprising in principal part a uranium-bearing ceramic phase; (c) an electrical conduit connecting the electrolyte bath and the at least one anode so as to complete an electrical circuit comprising the electrolyte bath and the at least one anode; and (d) a source of electric current, the current adapted to flow from the electrolyte bath to the at least one anode, so as to be capable of converting the oxidized substance to the reduced substance.

The apparatus may comprise a plurality of anodes in any geometric arrangement or shape, such as those known in the art.

The electrolytes used in accordance with the apparatus of the present invention may be solid or liquid, such as is known in the art, depending upon the electrolysis reaction to be brought about.

Also included in the present invention are methods of producing a reduced substance from an oxidized substance, featuring use of a uranium-bearing ceramic phase electrode and apparatus as described herein. The method of producing a reduced substance from an oxidized substance generally comprises: (1) providing an apparatus comprising: (a) an electrolyte bath containing the oxidized substance; (b) at least one anode in contact with the electrolyte bath, the anode(s) comprising in principal part a uranium-bearing ceramic phase; (c) an electrical conduit connecting the electrolyte bath and the anode(s) so as to complete an electrical circuit comprising the electrolyte bath and the anode(s); and (d) a source of electric current, the current adapted to flow from the electrolyte bath to the at least one anode, so as to be capable of converting the oxidized substance to the reduced substance; and (2) causing the current to flow from the electrolyte bath to the at least one anode so as to produce the reduced substance from the oxidized substance.

Included in the present invention is an apparatus for generally producing a metal produced from a metal compound, such as an oxide or salt, dissolved in a molten from a molten salt bath, the apparatus comprising: (a) a cathodic molten bath comprising a metal in an oxidized state; (b) at least one anode in contact with the cathodic molten bath, the anode(s) comprising in principal part a uranium-bearing ceramic phase; and (c) a source of electric current, the current adapted to flow from the cathodic molten aluminum bath to the anode(s). Also included in the present invention is method of producing metal from a molten salt bath, the method comprising the steps of: (1) providing an apparatus comprising: (a) a cathodic molten salt bath comprising a metal in an oxidized state; (b) at least one anode in contact with the cathodic bath, the at least one anode comprising in principal part a uranium-bearing ceramic phase; and (c) a source of electric current, the current adapted to flow from the cathodic molten aluminum bath to the anode(s); and (2) causing the current to flow from the cathodic bath to the at least one anode so as to produce the metal in a reduced state from the metal in an oxidized state.

The metals may be any metal capable of being reduced from a molten salt bath, including metal is selected from the group consisting of aluminum, lead, magnesium, zinc, zirconium, titanium, and silicon.

Another aspect of the invention is an apparatus specifically for producing aluminum metal from alumina, featuring a uranium-bearing ceramic phase electrode. This apparatus comprises generally: (a) a cathodic molten aluminum bath; (b) a cryolite-based electrolyte fused salt bath in contact with the cathodic molten aluminum bath, the cryolite-based electrolyte fused salt bath being supplied with a source of alumina; (c) at least one anode in contact with the cryolite-based electrolyte fused salt bath, the anode(s) comprising in principal part a uranium-bearing ceramic phase; and (d) a source of electric current, the current adapted to flow from the cathodic molten aluminum bath to the anode(s).

The apparatus may have a plurality of anodes in any geometric arrangement or shape as is known in the art.

The invention also includes a method of producing aluminum metal from alumina, featuring use of a uranium-bearing ceramic phase electrode and using an apparatus of the present invention as described above. The method comprising the steps of: (1) providing an apparatus comprising: (a) a cathodic molten aluminum bath; (b) a cryolite-based electrolyte fused salt bath in contact with the cathodic molten aluminum bath, the cryolite-based electrolyte fused salt bath being supplied with a source of alumina; (c) at least one anode in contact with the cryolite-based electrolyte fused salt bath, the at least one anode comprising in principal part a uranium-bearing ceramic phase; and (d) a source of electric current, the current adapted to flow from the cathodic molten aluminum bath to the anode(s); and (2) causing the current to flow from the cathodic molten aluminum bath to the anode(s) so as to produce aluminum from the alumina. A plurality of anodes may be used.

The present invention also includes MHD and solid oxide fuel cells incorporating one or more a uranium-bearing ceramic phase-bearing anodes of the present invention as described herein.

The magnetohydrodynamic energy generation systems and solid oxide fuel cells of the present comprise at least one electrode (as in arrangements otherwise known in the art), where the anode(s) comprise(s) in principal part a uranium-bearing ceramic phase. The electrodes used in the MHD process for energy generation are exposed to high-temperature molten oxides generated from fossil-fuel-based reactants (i.e., from the ash obtained from coal). Electrodes used in electric arc furnaces for melting refractory oxides are also exposed to high-temperature oxide liquids. These oxides are quite corrosive at elevated temperatures and such corrosion can limit operational life. Potential electrode materials must be: i) resistant to corrosion by molten oxides, ii) electrically conductive, and iii) mechanically robust.

The uranium-bearing ceramic phase may be produced through any number of chemical reactions known in the art, including the reaction of a solid mixture of salts, the reaction between solid and fluid phases where the fluid phase may be a gas or liquid (e.g., the oxidation of uranium or a uranium-bearing alloy by gaseous oxygen), the reaction between two fluid phases where either fluid phase may be a gas or liquid, the reaction between two or more species within a single fluid phase where the fluid phase may be a gas or liquid, and solid-solid or solid-liquid displacement reactions. The uranium ceramics used in accordance with the present invention may also be produced in accordance with the process described in co-pending U.S. patent application Ser. No. 60/083,534, filed Apr. 29, 1998 and entitled Method For Fabricating Shaped Monolithic Ceramics and Ceramic Composites Through Displacive Compensation of Porosity, and Ceramics and Composites Made Thereby, hereby incorporated herein by reference.

Known processes of ceramic technology can be employed in the manufacture of uranium-bearing bodies of the present invention. For example, the uranium-bearing bodies may be formed in desired shapes from uranium-bearing powder by deformation processing, including pressing, extrusion, rolling, or forging, any of which may be followed by sintering at a high temperature. The uranium-bearing bodies may be produced by casting a powder-bearing slurry or a molten solution or mixture into a mold, any of which may be followed by a heat treatment to allow for sintering or crystallization. The uranium-bearing bodies may formed into desired shapes by solid free-form fabrication methods involving the deposition of successive uranium-bearing layers of controlled shape and thickness and then sintering at a high temperature. The uranium-bearing bodies may be formed into desired shapes by deposition onto a substrate of desired shape, for example by flame spraying, plasma spraying, sputtering, evaporation, laser ablation, chemical vapor deposition, spray deposition, molecular beam epitaxy, ion implantation, or other physical or chemical vapor deposition processes, followed by sintering at a high temperature. The sintering treatment following any of these shape forming methods may involve simultaneous reaction to form the desired uranium-bearing ceramic phase or may involve the application of an external force to enhance the sintering rate. The ceramic body may have any desired shape, however plates or cylinders are preferred.

The molten electrolyte can, as in normal practice for aluminum production, consist of fluorides, in particular cryolite, or of a known mixture of oxides, as can be found in technical literature.

On applying the ceramic anode to the electrolysis of aluminum, the anode must on the other hand be in contact with a molten charge and on the other hand be connected to a power supply.

DETAILED DESCRIPTION OF THE PREFERRED EMBODIMENTS

In accordance with the foregoing summary, the following presents a detailed description of the preferred embodiment of the invention that is currently considered to be the best mode with respect to each embodiment described.

Compositions including a uranium-bearing ceramic phase as in the present invention are attractive compositions for electrodes exposed to corrosive conditions. The present invention provides for uranium-bearing ceramic phase electrodes that contain in principal part a uranium-bearing ceramic phase. The electrode may also contain one or more of another second phase. The second phase(s) may be comprised of a metal or ceramic or polymer or a mixture of these. The second phase may possess an electrical conductivity higher than that of the uranium-bearing ceramic phase, preferably without increasing the oxygen ion conductivity. The second phase may also possess a higher ductility and/or higher strength and/or higher toughness than the uranium-bearing ceramic phase.

Uranium oxide (or urania), $UO_{2\pm x}$, is a high-melting (about 2830° C.) ceramic compound. Urania is also a highly inert compound. For example, $UO_{2\pm x}$ does not form stable solid compounds with $SiO_2$, MgO or $Al_2O_3$ (i.e., urania is stable in contact with acidic, basic, and neutral oxide compounds) [1–4]. Urania also does not react with these oxides to form liquids until very high temperatures are attained (about 1650° C.) [1–4]. $UO_{2\pm x}$ also possesses low solubility in molten silica at temperatures below about 2000 C. Urania is also resistant to reduction; that is, extreme conditions are required to reduce urania to uranium metal). For example, urania is thermodynamically stable in contact with molten aluminum at temperatures in excess of 700° C. [9]. Owing to the inert nature of urania, urania-bearing phase(s), when used as the uranium-bearing ceramic phase, are attractive compositions for electrodes exposed to corrosive conditions. In accordance with the present invention, the uranium-bearing ceramic phase electrodes contain at least one uranium-bearing ceramic phase. In a preferred embodiment, the uranium-bearing ceramic phase consists essentially of $UO_{2\pm x}$. The electrode may also contain one or more of another second phase. The second phase(s) may be comprised of metal, metal alloy, metal compound, ceramic, ceramic alloy or ceramic compound, or mixtures thereof, other than the uranium-bearing phase.

The second phase may possess an electrical conductivity higher than that of the uranium-bearing ceramic phase. The second phase may also possess a higher ductility and/or higher strength and/or higher toughness than the uranium-bearing ceramic phase.

The uranium-bearing ceramic phase may include $UO_{2\pm x}$, urania-bearing compounds, or urania-bearing solid solutions. They may also include other uranium-bearing ceramics, such as those formed from or otherwise incorporating uranium carbide and uranium nitride. In a preferred embodiment, the uranium-bearing ceramic phase consists essentially of $UO_{2\pm x}$, urania-bearing compounds, or urania-bearing solid solutions. In an alternative embodiment, the uranium-bearing ceramic phase may be replaced in whole or in part by uranium-bearing, high-melting intermetallic compounds.

The uranium-bearing ceramic phase electrode may be in the form of a coating on a substrate or in the form of a shaped, bulk body.

In order to reduce greenhouse gas emissions and to allow for lower energy costs, manufacturers of aluminum have been actively looking for inert anode materials to replace carbon in the Hall-Heroult Cell for aluminum production [5–8]. A replacement material must be: i) resistant to dissolution by cryolite-based melts, ii) resistant to reduction by molten aluminum, iii) electrically conductive, and iv) mechanically robust. A strong candidate to replace carbon is a composite of $UO_{2\pm x}$ with a conductive metal, such as copper, or a metal alloy. The inert nature of urania make it attractive as a component in an anode. $UO_{2\pm x}$ is also good semiconductor that, coupled with the presence of a conductive metal(e.g., copper or a copper alloy).in a composite, should allow for satisfactory electrical conduction. The presence of a ductile metal in a composite with a uranium-bearing ceramic phase should also provide the mechanical toughness required of an anode material.

Composites of urania, $UO_{2\pm x}$ and oxidation-resistant metal alloys (e.g., Co—Cr—Al-based alloys) are also attractive candidate materials for electrode applications involving oxidizing atmospheres, and may also be used in accordance with the present invention. Co-based alloys can enhance the toughness and electrical conductivity of the composites, while retaining good oxidation resistance at elevated temperatures.

One method for producing urania/metal composites for electrode applications is to hot press (i.e., apply a uniaxial or hydrostatic pressure at an elevated temperature) a mixture of urania and metal at a temperature below the melting point of the metallic phase, so as to obtain a dense urania/metal composite. The resulting body can then be machined to obtain a desired surface finish or to obtain a more complicated shape. Another effective method for producing shaped urania/metal composites is through the Displacive Compensation of Porosity (DCP) process [10]. In the DCP process, a reactive metal liquid is infiltrated into a porous ceramic preform. The liquid metal and solid ceramic undergo a displacement reaction so as to yield new ceramic and metal phases. This process is described in co-pending U.S. patent application Ser. No. 60/083,534, filed Apr. 29, 1998 and entitled Method For Fabricating Shaped Monolithic Ceramics and Ceramic Composites Through Displacive Compensation of Porosity, and Ceramics and Composites Made Thereby, which is hereby incorporated herein by reference.

In the DCP process, the product ceramic and metal phases possesses a larger volume than the reactant ceramic phase, so that pores in the initial preform can be filled in with the increased volume of the new ceramic phase. In other words, densification can occur at relatively low reaction temperatures without sintering. Further, the reactions occur at the internal solid/liquid interfaces with little change in the external specimen volume (i.e., near net-shape processing). The low-temperature densification and near net-shape features of the DCP process, have been demonstrated to date in the fabrication of lightweight, ceramic-rich MgO/Mg—Al composites and higher-melting, co-continuous $MgAl_2O_4$/Fe—Ni—Al-bearing composites. The DCP process can also be used to produce dense, near net-shaped urania/metal composites. Consider, for example, the following displacement reactions:

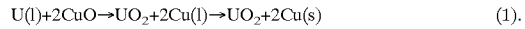

$$U(l)+2CuO \rightarrow UO_2+2Cu(l) \rightarrow UO_2+2Cu(s) \qquad (1).$$

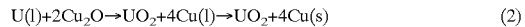

$$U(l)+2Cu_2O \rightarrow UO_2+4Cu(l) \rightarrow UO_2+4Cu(s) \qquad (2)$$

The volume of 1 mole of a urania (24.6 cm³/mole) plus 2 moles of copper (2×7.1 cm³/mole) is 59% larger than the volume of 2 moles of CuO (2×12.2 cm³/mole). Similarly, the volume of 1 mole of urania plus 4 moles of copper is 13% larger than the volume of 2 moles of $Cu_2O$ (2×23.4 cm³/mole). Hence, porous preforms consisting of a mixture of CuO and $Cu_2O$ with appropriate values of porosity (between 13 and 59%) can be converted by reactions (1) and (2) into dense urania/copper composites (i.e., the volume increase due to these reactions can completely fill the pores). Reactions (1) and (2) generate urania-bearing composites comprised of 36.6 and 53.6 vol % copper, respectively (note: this phase content refers to the solid copper obtained upon cool down to room temperature). That is, the urania content of the resulting composite can be varied by changing the amounts of each type of copper oxide used in the preform. The relative amounts of a urania and copper can also be adjusted by adding some amount of inert $UO_2$ to the preform and/or by altering the preform porosity. Hence, a wide range of oxide/metal contents can be achieved., A reaction bonding approach can also be used to produce shaped urania/metal composites. The molar volume of urania is 96% larger than the molar volume of uranium. This volume expansion associated with uranium oxidation can be used to counter the sintering-induced shrinkage in a green body, such as, for example, a porous green body consisting of a mixture of urania, uranium, and another, more noble metal (e.g., Cu). Such a green body can be produced by pressing (uniaxial or hydrostatic pressing) of a mixture of urania, uranium, and more noble metal powders. Such a green body should be relatively easy to machine (i.e., compared to a dense urania body), owing to the porous nature of the green body and the presence of ductile uranium. The uranium content and porosity of the preform may be properly adjusted such that the volume expansion associated with the selective oxidation of uranium can be used to offset the subsequent volume contraction upon sintering of the oxidized, porous body, so that a dense, monolithic urania/metal (e.g., $UO_{2\pm x}$/Cu composite) body can be produced with the same shape and dimensions as the porous green body.

Several examples illustrate the present invention in its many embodiments.

EXAMPLE 1

A urania/metal composite may be used as an inert anode in a Hall cell for making aluminum. The urania/metal composite may be fabricated by hot pressing of a mixture of urania and metal powders, followed by machining. The Hall cell is operated in accordance with known methods and apparatus for the electrowinning of aluminum with the urania/metal composite electrode(s) in place of carbon electrode(s) of the prior art.

EXAMPLE 2

A urania/metal composite may be used as an inert anode in a Hall cell for making aluminum as described in Example 1, except that the urania/metal composite is fabricated by the displacive compensation of porosity (DCP) method.

EXAMPLE 3

A urania/metal composite may be used as inert anode in a Hall cell for making aluminum as described in Example 1, except that the urania/metal composite is fabricated by the selective oxidation of uranium in a compacted mixture of urania, uranium, and another, more noble metal (e.g., copper) or metal alloy.

EXAMPLE 4

A urania/metal composite may be used as an inert electrode in a fuel cell, such as a solid oxide fuel cell, in accordance with known methods and apparatus of the prior art using the urania/metal composite electrode(s) in place of those of the prior art. The urania/metal composite may be fabricated by hot pressing of a mixture of urania and metal powders.

EXAMPLE 5

A urania/metal composite may be used as an inert electrode in a fuel cell as described in Example 4, with the exception that the urania/metal composite is fabricated by the DCP method.

EXAMPLE 6

A urania/metal composite may be used as an inert electrode in a fuel cell as described in Example 4, with the exception that the urania/metal composite is fabricated by the selective oxidation of uranium a compacted mixture of urania, uranium, and another, more noble metal (e.g., copper) or metal alloy.

REFERENCES

1. J. Holc, D. Kolar, J. Solid State Chem., 61 [2]260–262 (1986)
2. S. Lungu, J. Nucl. Mater., 19 [2]158 (1966)
3. S. M. Lang, F. P. Knudsen, C. L. Fillmore, R. S. Roth, Natl. Bur. Standards Circ., No. 568, pp. 14, 17 (1956)
4. Phase Diagrams for Ceramists, Vol. 1, Edited by E. M. Levin, C. R. Robbins, H. F. McMurdie, p. 65, The American Ceramic Society, Westerville, Ohio 1985
5. R. P. Pawlek, Inert Anodes for the Primary Aluminum Industry: An Update, Light Metals 1996, pp. 243–248, TMS, 1996
6. H. Xiao, R. Hovland, S. Rolseth, J. Thonstad, On the Corrosion and the Behavior of Inert Anodes in Aluminum Electrolysis, Light Metals 1992, pp. 389–399, TMS, 1992
7. S. P. Ray, Effect of Cell Operating Parameters on Performance of Inert Anodes in Hall-Heroult Cells, Light Metals 1987, pp. 367–380, TMS, 1987
8. H. Zhang, V. deNora, J. A. Sekhar, Materials Used in the Hall-Heroult Cell for Aluminum Production, The Minerals, Metals & Materials Society, 1994
9. I. Barin, Thermochemical Data of Pure Substances, VCH Verlagsgesellschaft, Germany, 1989
10. P. Kumar, K. H. Sandhage Method for Fabricating Shaped Monolithic Ceramics and Ceramic Composites through Displacive Compensation of Porosity, and Ceramics and Composites Made Thereby, U.S. patent application Ser. No. 60/083,534, Apr. 29, 1998
11. S. Wu, D. Holz, N. Claussen, Mechanisms and Kinetics of Reaction-Bonded Aluminum Oxide Ceramics, J. Am. Ceram. Soc., 76 [4]970–80 (1993)
12. S. Wu, N. Claussen, Fabrication and Properties of Low-Shrinkage Reaction-Bonded Mullite, J. Am. Ceram. Soc., 74 [10]2460–63 (1991)

These references are hereby incorporated herein by reference.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, it will be within the ability of one of ordinary skill in the art to make alterations or modifications to the present invention, such as through the substitution of equivalent materials or structural arrangements, or through the use of equivalent process steps, so as to be able to practice the present invention without departing from its spirit as reflected in the appended claims, the text and teaching of which are hereby incorporated by reference herein. It is the intention, therefore, to limit the invention only as indicated by the scope of the claims and equivalents thereof.

What is claimed is:

1. An electrolysis apparatus comprising:
   (a) an electrolyte;
   (b) at least one anode in contact with said electrolyte, said at least one anode comprising at least 20 percent of a uranium-bearing ceramic phase, wherein said uranium-bearing ceramic phase is selected from the group consisting of urania, uranium nitride, and mixtures thereof; and
   (c) an electrical conduit connecting said electrolyte and said at least one anode so as to complete an electrical circuit comprising said electrolyte and said at least one anode.

2. An electrolysis apparatus according to claim 1 wherein said at least one anode additionally comprises at least one additional phase of a metal, metal alloy, metal compound, ceramic, ceramic alloy or ceramic compound, or mixtures thereof, other than the uranium-bearing phase.

3. An electrolysis apparatus according to claim 1 wherein said at least one anode additionally comprises at least one discontinuous phase other than the uranium-bearing phase.

4. An electrolysis apparatus according to claim 1 wherein said at least one anode comprises at least 50 percent of a uranium-bearing ceramic phase.

5. An electrolysis apparatus according to claim 1 wherein said at least one anode comprises at least 80 percent of a uranium-bearing ceramic phase.

6. An electrolysis apparatus according to claim 1 wherein said uranium-bearing ceramic phase comprises a material selected from the group consisting of urania, urania solid, solutions and urania compounds.

7. An apparatus for producing a reduced substance from an oxidized substance, said apparatus comprising:
   (a) an electrolyte bath containing said oxidized substance;
   (b) at least one anode in contact with said electrolyte bath, said at least one anode comprising in principal part a uranium-bearing ceramic phase, wherein said uranium-bearing ceramic phase is selected from the group consisting of urania, uranium nitride, and mixtures thereof;
   (c) an electrical conduit connecting said electrolyte bath and said at least one anode so as to complete an electrical circuit comprising said electrolyte bath and said at least one anode; and
   (d) a source of electric current, said current adapted to flow from said electrolyte bath to said at least one anode, so as to be capable of converting said oxidized substance to said reduced substance.

8. An apparatus according to claim 7 wherein said at least one anode comprises a plurality of anodes.

9. An apparatus according to claim 7 wherein said wherein said at least one anode additionally comprises at least one additional phase of a metal, metal alloy, metal compound, ceramic, ceramic alloy or ceramic compound, or mixtures thereof, other than the uranium-bearing phase.

10. An apparatus according to claim 7 wherein said at least one anode additionally comprises at least one discontinuous phase other than the uranium-bearing phase.

11. An apparatus according to claim 8 wherein said at least one anode comprises at least 20 percent of a uranium-bearing ceramic phase.

12. An apparatus according to claim 7 wherein said at least one anode comprises at least 50 percent of a uranium-bearing ceramic phase.

13. An apparatus according to claim 7 wherein said at least one anode comprises at least 80 percent of a uranium-bearing ceramic phase.

14. A method of producing a reduced substance from an oxidized substance, said method comprising the steps of:
   (1) providing an apparatus comprising:
      (a) an electrolyte bath containing said oxidized substance;
      (b) at least one anode in contact with said electrolyte bath, said at least one anode comprising in principal part a uranium-bearing ceramic phase, wherein said uranium-bearing ceramic phase is selected from the group consisting of urania, uranium nitride, and mixtures thereof;
      (c) an electrical conduit connecting said electrolyte bath and said at least one anode so as to complete an electrical circuit comprising said electrolyte bath and said at least one anode; and
      (d) a source of electric current, said current adapted to flow from said electrolyte bath to said at least one anode, so as to be capable of converting said oxidized substance to said reduced substance; and
   (2) causing said current to flow from said electrolyte bath to said at least one anode so as to produce said reduced substance from said oxidized substance.

15. A method according to claim 14 wherein said at least one anode comprises a plurality of anodes.

16. A method according to claim 14 wherein said wherein said at least one anode additionally comprises at least one additional phase of a metal, metal alloy, metal compound, ceramic, ceramic alloy or ceramic compound, or mixtures thereof, other than the uranium-bearing phase.

17. A method according to claim 14 wherein said at least one anode additionally comprises at least one discontinuous phase other than the uranium-bearing phase.

18. A method according to claim 14 wherein said at least one anode comprises at least 20 percent of a uranium-bearing ceramic phase.

19. A method according to claim 14 wherein said at least one anode comprises at least 50 percent of a uranium-bearing ceramic phase.

20. A method according to claim 14 wherein said at least one anode comprises at least 80 percent of a uranium-bearing ceramic phase.

* * * * *

UNITED STATES PATENT AND TRADEMARK OFFICE
CERTIFICATE OF CORRECTION

PATENT NO.      : 6,616,826 B1                                                    Page 1 of 1
DATED           : September 9, 2003
INVENTOR(S)     : Kenneth H. Sandhage et al.

It is certified that error appears in the above-identified patent and that said Letters Patent is hereby corrected as shown below:

Column 3,
Line 47, please delete the number "9000º" and replace it with -- 900º --.

Column 4,
Line 57, after the word "least" and before the word "electrocatalyst", please insert the word -- one --.

Column 6,
Line 6, please delete the phrase "for-use" and insert the phrase -- for use --.

Signed and Sealed this

Sixth Day of January, 2004

JAMES E. ROGAN
*Director of the United States Patent and Trademark Office*